United States Patent
Lin et al.

(10) Patent No.: US 11,222,200 B2
(45) Date of Patent: Jan. 11, 2022

(54) VIDEO-BASED 3D HAND POSE AND MESH ESTIMATION BASED ON TEMPORAL-AWARE SELF-SUPERVISED LEARNING

(71) Applicant: TENCENT AMERICA LLC, Palo Alto, CA (US)

(72) Inventors: Shih-Yao Lin, Palo Alto, CA (US); Yusheng Xie, Mountain View, CA (US); Hui Tang, Mountain View, CA (US); Chao Huang, Palo Alto, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 12 days.

(21) Appl. No.: 16/789,507

(22) Filed: Feb. 13, 2020

(65) Prior Publication Data
US 2021/0256251 A1 Aug. 19, 2021

(51) Int. Cl.
| | |
|---|---|
| *G06K 9/00* | (2006.01) |
| *G06K 9/46* | (2006.01) |
| *G06K 9/62* | (2006.01) |
| *G06K 9/82* | (2006.01) |
| *G06N 3/08* | (2006.01) |
| *G06N 3/04* | (2006.01) |

(52) U.S. Cl.
CPC ..... *G06K 9/00355* (2013.01); *G06K 9/00208* (2013.01); *G06K 9/4652* (2013.01); *G06K 9/6256* (2013.01); *G06K 9/82* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 10,956,724 B1 * | 3/2021 | Terrano | G06F 3/0425 |
| 11,127,206 B2 * | 9/2021 | Chachek | G06T 7/20 |

(Continued)

FOREIGN PATENT DOCUMENTS

| | | | | |
|---|---|---|---|---|
| CN | 109214245 A | * | 1/2019 | |
| WO | WO-2019168765 A1 | * | 9/2019 | G06N 3/08 |
| WO | WO-2020050828 A1 | * | 3/2020 | G06N 3/0454 |

OTHER PUBLICATIONS

Ge et al., "3D Hand Shape and Pose Estimation From a Single RGB Image", 2019 IEEE/CVF Conference on Computer Vision and Pattern Recognition, Jun. 15-20, 2019, Retrieved from the Internet <URL:https://openaccess.thecvf.com/content_cvpr_2018/papers/Ge_Hand_PointNet_3D_CVPR_2018_paper.pdf>, pp. 10833-10842 (11 pages total).

(Continued)

*Primary Examiner* — Mohammed Rachedine
(74) *Attorney, Agent, or Firm* — Sughrue Mion, PLLC

(57) ABSTRACT

A method, computer program, and computer system is provided for estimating three-dimensional hand poses in images. Data corresponding to two hand images is receive, and an optical flow value corresponding to a change in a hand gesture in the received hand image data is calculate. A heat map is generated based on the calculated optical flow, and a hand mesh map is estimated based on the generated heat map. A hand pose present within the hand images is determined based on the estimated hand mesh map.

19 Claims, 6 Drawing Sheets

(56) References Cited

U.S. PATENT DOCUMENTS

| | | |
|---|---|---|
| 2011/0182469 A1 | 7/2011 | Ji et al. |
| 2014/0071125 A1* | 3/2014 | Burlina .................. G06T 17/00 |
| | | 345/420 |
| 2017/0192515 A1 | 7/2017 | Menadeva et al. |
| 2018/0189556 A1* | 7/2018 | Shamir .................. G06T 7/269 |
| 2019/0147621 A1* | 5/2019 | Alesiani .................. G06T 7/50 |
| | | 382/190 |
| 2019/0213406 A1 | 7/2019 | Porikli et al. |
| 2019/0278983 A1 | 9/2019 | Iqbal et al. |
| 2020/0211206 A1* | 7/2020 | Wang .................... G06N 20/00 |

OTHER PUBLICATIONS

International Search Report dated Apr. 26, 2021 from the International Searching Authority in International Application No. PCT/2021/017059.

Written Opinion dated Apr. 26, 2021 from the International Searching Authority in International Application No. PCT/2021/017059.

* cited by examiner

VIDEO-BASED 3D HAND POSE AND MESH ESTIMATION BASED ON TEMPORAL-AWARE SELF-SUPERVISED LEARNING

BACKGROUND

This disclosure relates generally to field of computing, and more particularly to machine learning.

Hand pose estimation is the task of finding the joints of the hand from an image or a set of video frames. Estimating three-dimensional (3D) hand poses from red-green-blue (RGB) color images is essential to a wide range of potential applications, such as computer vision, virtual reality, augmented reality, and other forms of human-computer interaction. Estimating hand poses from RGB images has become significantly more popular due to the accessibility of capturing RGB images through webcams, Internet of Thing (IoT) cameras, and smartphones.

SUMMARY

Embodiments relate to a method, system, and computer readable medium for estimating 3D hand poses. According to one aspect, a method for estimating 3D hand poses is provided. The method may include receiving, by a computer, data corresponding to two hand images. The computer may calculate an optical flow value corresponding to a change in a hand gesture in the received hand image data and may generate a heat map based on the calculated optical flow. A hand mesh map may be estimated by the computer based on the generated heat map, and a hand pose present within the hand images may be determined based on the estimated hand mesh map.

According to another aspect, a computer system for estimating 3D hand poses is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving, by a computer, data corresponding to two hand images. The computer may calculate an optical flow value corresponding to a change in a hand gesture in the received hand image data and may generate a heat map based on the calculated optical flow. A hand mesh map may be estimated by the computer based on the generated heat map, and a hand pose present within the hand images may be determined based on the estimated hand mesh map.

According to yet another aspect, a computer readable medium for estimating 3D hand poses is provided. The computer readable medium may include one or more computer-readable storage devices and program instructions stored on at least one of the one or more tangible storage devices, the program instructions executable by a processor. The program instructions are executable by a processor for performing a method that may accordingly include receiving, by a computer, data corresponding to two hand images. The computer may calculate an optical flow value corresponding to a change in a hand gesture in the received hand image data and may generate a heat map based on the calculated optical flow. A hand mesh map may be estimated by the computer based on the generated heat map, and a hand pose present within the hand images may be determined based on the estimated hand mesh map.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
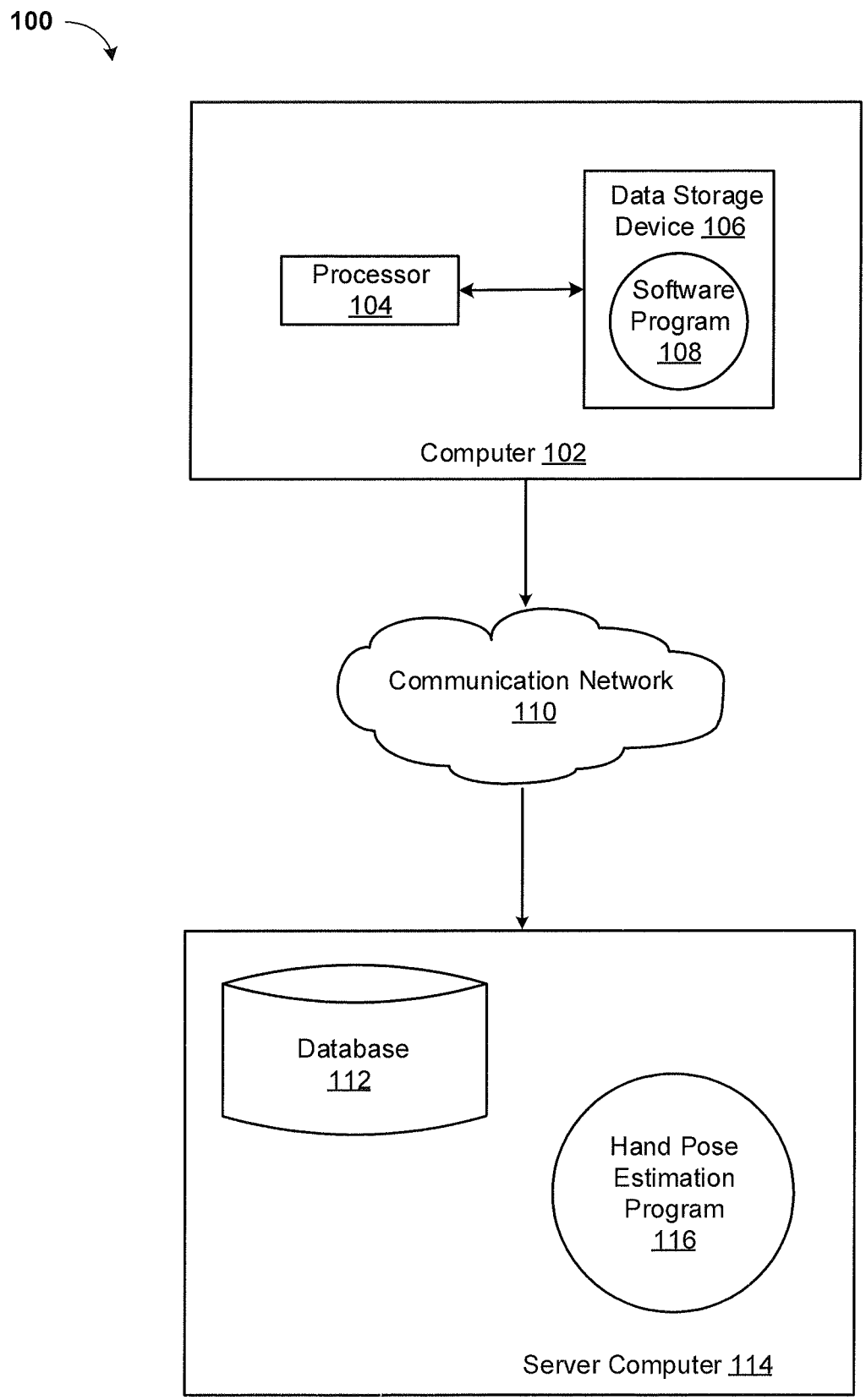
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to machine learning. The following described exemplary embodiments provide a system, method and program product to, among other things, estimate 3D hand poses. Therefore, some embodiments have the capacity to improve the field of computing by allowing for the use of deep neural networks to allow a computer to determine 3D hand poses using only 2D spatial information.

As previously described, hand pose estimation is the task of finding the joints of the hand from an image or a set of video frames. Estimating three-dimensional (3D) hand poses from red-green-blue (RGB) color images is essential to a wide range of potential applications, such as computer vision, virtual reality, augmented reality, and other forms of human-computer interaction. Estimating hand poses from RGB images has become significantly more popular due to the accessibility of capturing RGB images through webcams, Internet of Thing (IoT) cameras, and smartphones. Estimating 3D hand pose directly from RGB images may be a challenging task, but progress has been made by training deep models with annotated 3D poses. However, annotating 3D poses may be difficult, and, as such, only a few 3D hand pose datasets may be available with limited sample sizes. It may be advantageous, therefore, to use machine learning and neural networks to train 3D pose estimation models from RGB images without the need of explicit 3D annotations (i.e., training with only 2D information).

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer-readable medium that estimates 3D hand poses. According to the present embodiment, a self-supervised learning model, called temporal-aware self-supervised network (TASSN), may be used to estimate 3D hand poses and meshes from videos annotated with only 2D key frame positions by enforcing temporal consistency constraints.

Referring now to FIG. 1, a functional block diagram of a networked computer environment illustrating a hand pose estimation system 100 (hereinafter "system") for improved estimation of 3D hand poses is shown. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for estimating three-dimensional hand poses in images is enabled to run a Hand Pose Estimation Program 116 (hereinafter "program") that may interact with a database 112. The Hand Pose Estimation Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger hand pose estimation program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
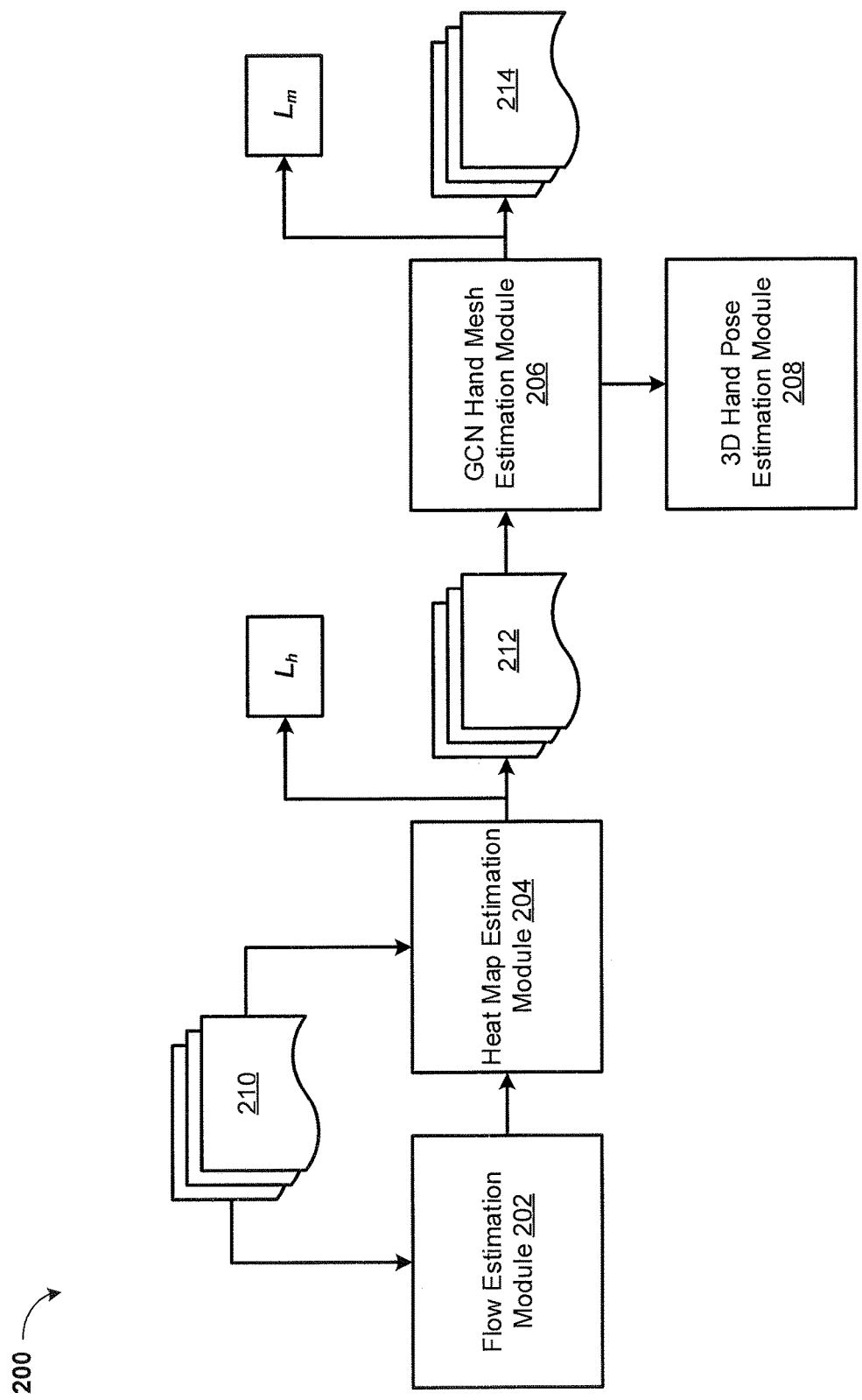
FIG. 2 is a block diagram of a program that estimates 3D hand poses, according to at least one embodiment.

Referring to FIG. 2, a block diagram 200 of the Hand Pose Estimation Program 116 of FIG. 1 is depicted. FIG. 2 may be described with the aid of the exemplary embodiments depicted in FIG. 1. The Hand Pose Estimation Program 116 may accordingly include, among other things, an flow estimation module 202, a heat map estimation module 204, a graph convolutional network (GCN) hand mesh estimation module 206, and a 3D hand pose estimation module 208. The Hand Pose Estimation Program 116 may be configured to receive hand image data 210, create feature data 212 for one or more features F, and may output hand pose data 214. The Hand Pose Estimation Program 116 may also generate a heat map loss value $L_h$ and a mesh loss value $L_m$. According to one embodiment, the Hand Pose Estimation Program 116 may be located on the computer 102 (FIG. 1). According to an alternative embodiment, the Hand Pose Estimation Program 116 may be located on the server computer 114 (FIG. 1).

The hand pose image data 212 may include, among other things, an RGB hand motion video x with N frames, where $x=\{I_t, \ldots, I_{t+n}\}$, $I_t \in \mathbb{R}^{3 \times W \times H}$ may be the t-th frame, and W and H may be the frame width and height, respectively. The 3D hand pose at frame t, $p_t \in \mathbb{R}^{3 \times K}$ may be represented by a set of 3D keypoint coordinates of the hand, where K may be the number of keypoints. Leveraging the temporal consistency properties of videos, the hand poses and meshes predicted in the forward and backward inference processes can perform mutual supervision. Utilizing such an approach, the model may be trained using self-supervised learning and 3D hand keypoint annotations may no longer be needed. Training pose estimators with hand meshes improves the performance because hand meshes can act as intermediate guidance for hand pose prediction.

The flow estimation module 202 may estimate optical flow between two consecutive frames using forward and backward inferences. The heat map estimation module 204 may compute 2D hand keypoints and generate the features for the 3D hand pose and mesh estimators. The estimated 2D keypoint heat maps may be denoted by $H \in \mathbb{R}^{K \times W \times H}$, where K may represent the number of keypoints. A two stacked hourglass network may be used to infer the hand keypoint heat maps H and compute the feature data 212.

The heat map estimation module 204 may concatenate $I_{t+1}$, $o_{t+1}$, and $H_t$ as input to the stacked hourglass network, which may produces heat maps $H_{t+1}$. The estimated $H_{t+1}$ may include K heat maps $\{H_{t+1}^k \in \mathbb{R}^{W \times H}\}_{k=1}^{k}$ where $H_{t+1}^k$ may express the confidence map of the location of the kth keypoint. The ground truth heatmap $\tilde{H}_{t+1}^k$ may be the Gaussian blur of the Dirac-δ distribution centered at the ground truth location of the kth keypoint. The heatmap loss $L_h$ at frame t may be defined by $$L_h = \frac{1}{K} \sum_{k=1}^{K} \|H_t^k - \overline{H}_t^k\|_F^2.$$

The graph convolutional network (GCN) hand mesh estimation module 206 may take hand feature data 212 as input and may infer the 3D hand mesh. The output hand mesh $m_t \in \mathbb{R}^{3 \times C}$ may be represented by a set of 3D mesh vertices, where C may be the number of vertices in a hand mesh. The hand mesh may be constructed in a coarse-to-fine manner, and a multi-level clustering algorithm may be used for coarsening the graph. The graph may be stored at each level, and the mapping between graph nodes may be stored in every two consecutive levels. In forward inference, the GCN may up-samples the node features according to the stored mappings and graphs and may perform the graph convolutional operations. To avoid collapsed meshes, a mesh loss value Lm may be used to calculate the difference between the silhouette of the predicted hand mesh $s_t$ and the ground-truth silhouette $\bar{s}_t$ at frame t. The silhouette loss may be defined by $L_m = \|s_t - \bar{s}_t\|_F^2$. To obtain $\bar{s}_t$ the hand silhouettes may be estimate from the training images, and a silhouette of a predicted hand mesh $m_t$ may be obtained by using a neural rendering approach.

The 3D hand pose estimation module 208 may directly infers 3D hand keypoints $p_t$ from the predicted hand mesh $m_t$. The 3D hand pose estimation module 208 may contain, among other things, a network of two stacked GCNs. A pooling layer may be added to each GCN to extract the pose features from the mesh, and the pose features may be fed into two fully connected layers to regress the 3D hand pose $p_t$.

Figure 3:
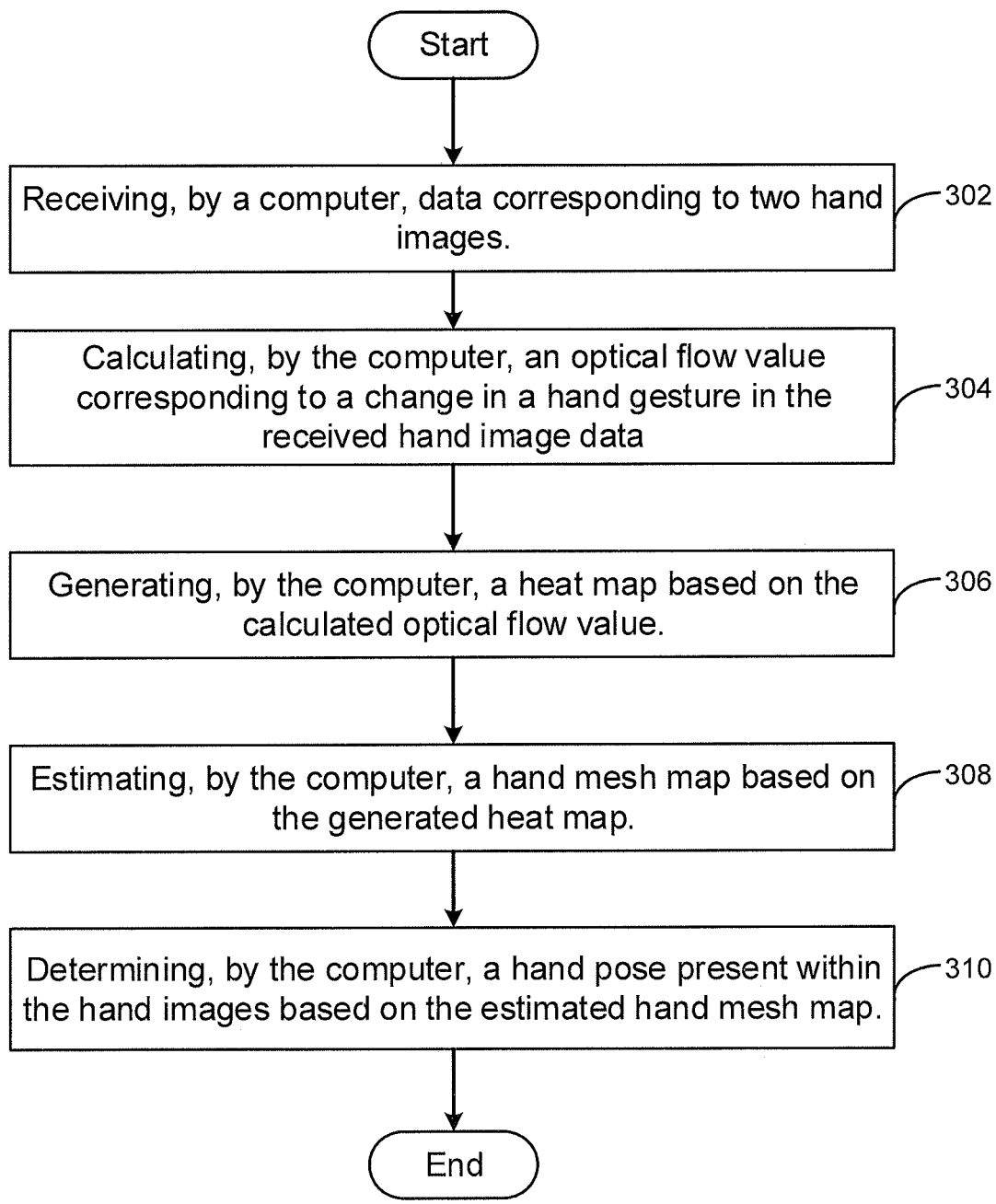
FIG. 3 is an operational flowchart illustrating the steps carried out by a program that estimates 3D hand poses, according to at least one embodiment.

Referring now to FIG. 3, an operational flowchart 300 illustrating the steps carried out by a program that estimates 3D hand poses is depicted. FIG. 3 may be described with the aid of FIGS. 1 and 2. As previously described, the Hand Pose Estimation Program 116 (FIG. 1) may quickly and effectively determine 3D hand poses from 2D data.

At 302, data corresponding to two hand images is received by a computer. The hand image data may be two-dimensional data. The hand image data may be two discrete images or may be consecutive frames extracted from a video source. In operation, the Hand Pose Estimation Program (FIG. 1) may receive hand image data 210 (FIG. 2) over the communication network 110 (FIG. 1).

At 304, an optical flow value corresponding to a change in a hand gesture in the received hand image data is calculated by the computer. By determining change in hand position between images, temporal data may be used to assist in determining the hand pose present within an image. In operation, the flow estimation module 202 (FIG. 2) may determine a change between two consecutive images from among the hand image data 210 (FIG. 2) using forward and backward inferences.

At 306, a heat map is generated by the computer based on the calculated optical flow value. The heat map may be computed using two-dimensional hand keypoints that may allow for the determination of features present in the three-dimensional hand poses and for the generation of mesh estimators. In operation, the heat map estimation module 204 (FIG. 2) may receive the optical flow value from the flow estimation module 202 (FIG. 2) and may take in the hand image data 210 (FIG.) as an input. The heat map estimation module 204 may generate a heat map and identify feature data 212 (FIG. 2) that may correspond to features of the hand image data 210.

At 308, a hand mesh map is estimated by the computer based on the generated heat map. The hand mesh map may allow for a coarse-to-fine construction of the hand pose by applying the operations of the layers of a convolutional neural network. In operation, the GCN hand mesh estimation module 206 may receive the heat map from the heat map estimation module 204 and the feature data 212. The GCN hand mesh estimation module 206 may estimate a three-dimensional mesh corresponding to a hand pose present within the hand image data 210.

At 310, a hand pose present within the hand images is determined by the computer based on the estimated hand mesh map. The hand poses may be generated without the use of three-dimensional annotations and using only two-dimensional image data. In operation, the 3D hand pose estimation module 208 may receive the hand mesh from the GCN hand mesh estimation module and may determine a pose associated with a hand based on the 3D hand mesh.

It may be appreciated that FIG. 3 provides only an illustration of one implementation and does not imply any limitations with regard to how different embodiments may be implemented. Many modifications to the depicted environments may be made based on design and implementation requirements.

Figure 4:
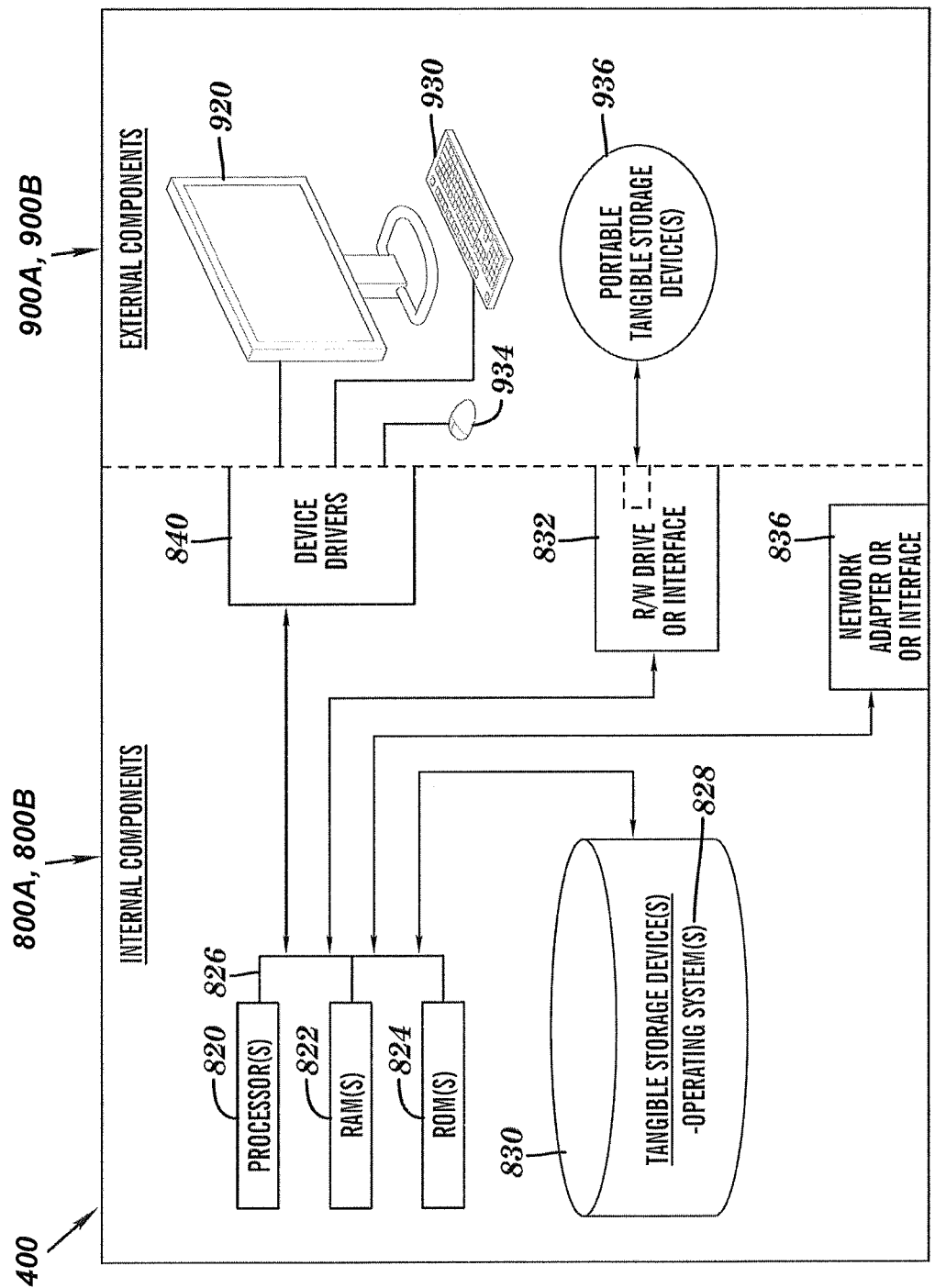
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Hand Pose Estimation Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Hand Pose Estimation Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Hand Pose Estimation Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Hand Pose Estimation Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
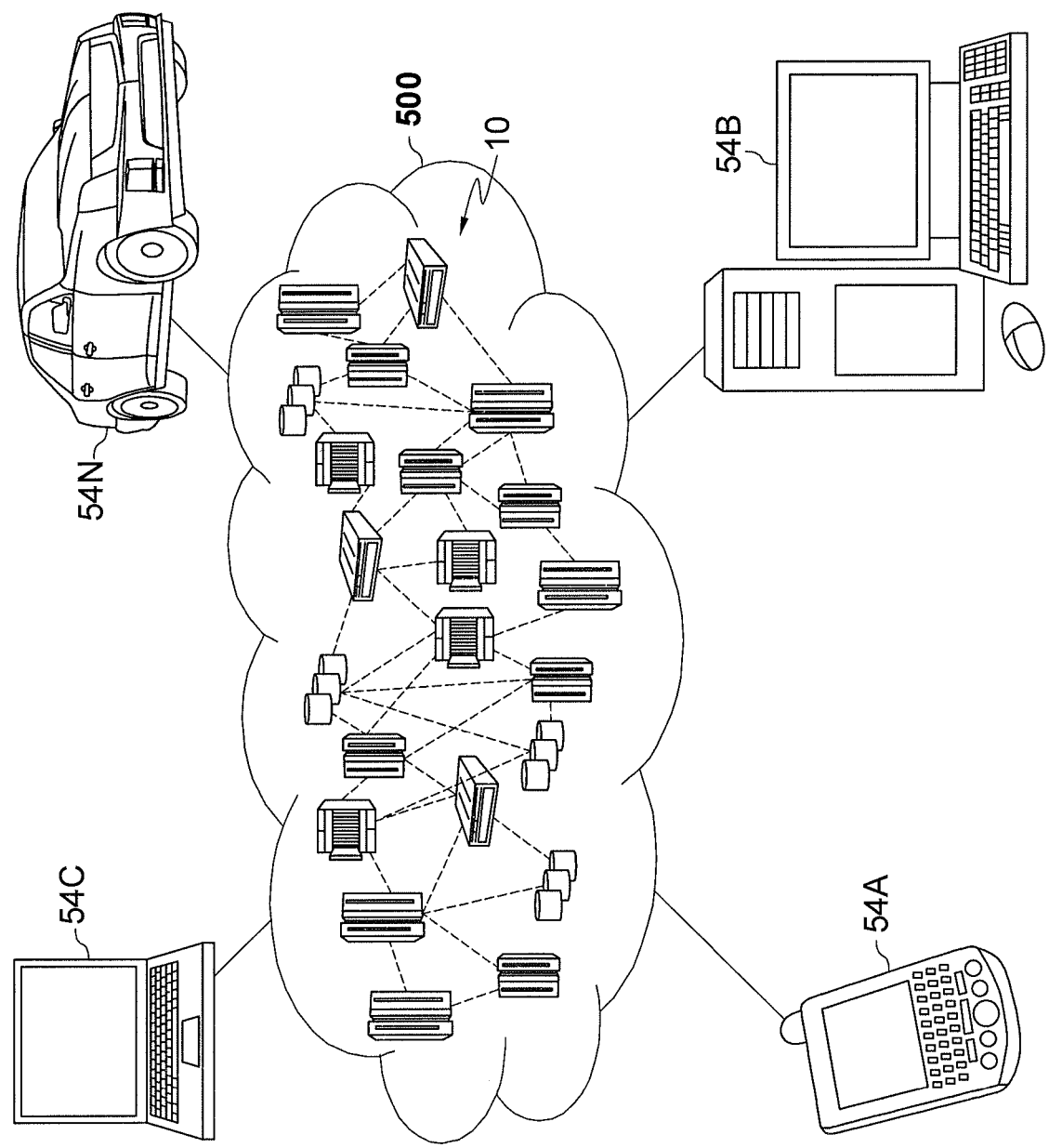
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
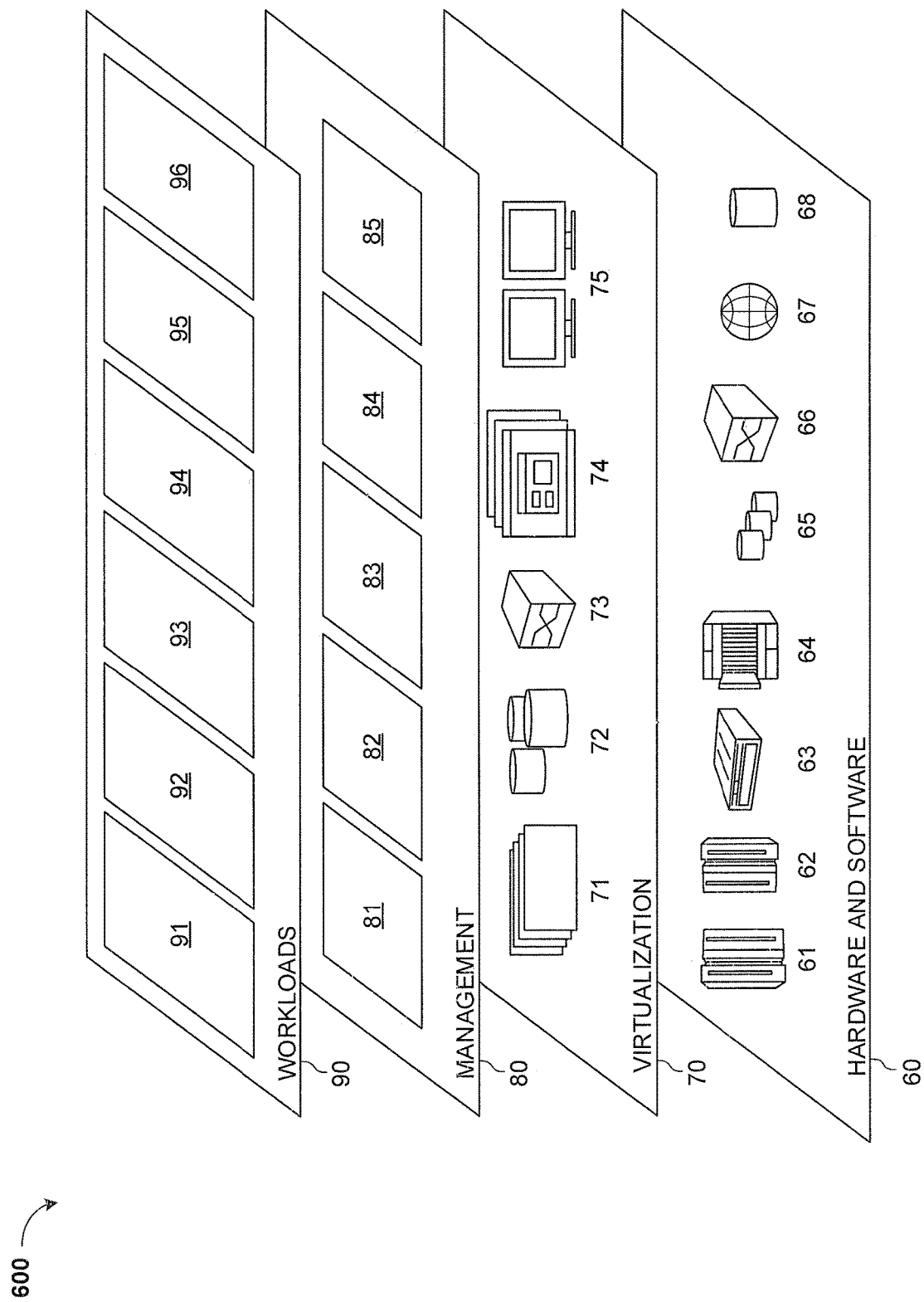
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Hand Pose Estimation 96. Hand Pose Estimation 96 may estimate 3D hand poses from 2D data.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computer, hand image data corresponding to a hand image of a hand in two consecutive frames of video;
calculating, by the computer, optical flows corresponding to a change in a hand gesture of the hand in the two consecutive frames in a forward direction and a backward direction;
generating, by the computer, heat maps based on the optical flows;
estimating, by the computer, a hand mesh map based on the heat maps; and
determining, by the computer, a three-dimensional (3D) hand pose present within the hand images in the two consecutive frames based on the hand mesh map.

2. The method of claim 1, wherein the calculating the optical flows comprises:
inferring a first optical flow between the hand images in the forward direction;
inferring a second optical flow between the hand images in the reverse direction; and
determining the optical flows based on the first optical flow and the second optical flow.

3. The method of claim 1, wherein the generating the heat map comprises:
computing one or more two-dimensional hand keypoints, based on the optical flows; and
generating one or more features based on the one or more two-dimensional hand keypoints.

4. The method of claim 3, wherein computing the one or more two-dimensional hand keypoints comprises:
inferring one or more features from the hand image data;
generating a confidence map corresponding to each of the one or more features; and
calculating a Gaussian blur of a Dirac-delta distribution corresponding to the confidence map.

5. The method of claim 1, wherein the estimating the hand mesh map comprises:
inferring a three-dimensional hand mesh based on one or more features in the hand image data; and
comparing a silhouette corresponding to the three-dimensional hand mesh to a silhouette corresponding to a predicting hand mesh associated with a training image.

6. The method of claim 1, wherein the determining the 3D hand pose comprises:
applying one or more graph convolutional networks to the hand mesh map;
extracting one or more pose features based on applying a pooling layer to the one or more graph convolutional networks; and
generating the 3D hand pose based on applying one or more fully connected layers to the one or more pose features.

7. The method of claim 1, wherein the 3D hand pose is determined using only two-dimensional data without three-dimensional annotations.

8. The method of claim 1, further comprising generating a heat map loss value and a mesh loss value.

9. The method of claim 8, further comprising training a hand pose estimator by minimizing the heat map loss value and the mesh loss value.

10. A system comprising:
one or more computer-readable non-transitory storage media configured to store computer program code; and
one or more computer processors configured to access the one or more computer-readable non-transitory storage media and operate according to the computer program code, the computer program code including:
receiving code configured to cause at least one of the one or more computer processors to receive hand image data corresponding to a hand image of a hand in two consecutive frames of video;
calculating code configured to cause at least one of the one or more computer processors to calculate optical flows corresponding to a change in a hand gesture of the hand in the two consecutive frames in a forward direction and a backward direction;
generating code configured to cause at least one of the one or more computer processors to generate heat maps based on the calculated optical flows;
estimating code configured to cause at least one of the one or more computer processors to estimate a hand mesh map based on the heat maps; and
determining code configured to cause at least one of the one or more computer processors to determine a three-dimensional (3D) hand pose present within the hand images in the two consecutive frames based on the hand mesh map.

11. The system of claim 10, wherein the calculating code comprises:
first inferring code configured to cause at least one of the one or more computer processors to infer a first optical flow between the hand images in the forward direction;
second inferring code configured to cause at least one of the one or more computer processors to infer a second optical flow between the hand images in the reverse direction; and
optical flow determining code configured to cause at least one of the one or more computer processors to determine the optical flows based on the first optical flow and the second optical flow.

12. The system of claim 10, wherein the generating code comprises:
computing code configured to cause at least one of the one or more computer processors to compute one or more two-dimensional hand keypoints; and
feature generating code configured to cause at least one of the one or more computer processors to generate one or more features based on the one or more two-dimensional hand keypoints.

13. The system of claim 12, wherein computing code comprises:

inferring code configured to cause at least one of the one or more computer processors to infer one or more features from the hand image data;

confidence map generating code configured to cause at least one of the one or more computer processors to generate a confidence map corresponding to each of the one or more features; and calculating code configured to cause at least one of the one or more computer processors to calculate a Gaussian blur of a Dirac-delta distribution corresponding to the confidence map.

14. The system of claim 10, wherein the estimating code comprises:

inferring code configured to cause the one or more computer processors to infer a three-dimensional hand mesh based on one or more features in the hand image data; and comparing code configured to cause the one or more computer processors to compare a silhouette corresponding to the three-dimensional hand mesh to a silhouette corresponding to a predicting hand mesh associated with a training image.

15. The system of claim 10, wherein the determining code comprises:

applying code configured to cause the one or more computer processors to apply one or more graph convolutional networks to the hand mesh map;

extracting code configured to cause the one or more computer processors to extract one or more pose features based on applying a pooling layer to the one or more graph convolutional networks; and hand pose generating code configured to cause the one or more computer processors to generate the 3D hand pose based on applying one or more fully connected layers to the one or more pose features.

16. The system of claim 10, wherein the 3D hand pose is determined using only two-dimensional data without three-dimensional annotations.

17. The system of claim 10, further comprising loss value generating code configured to cause at least one of the one or more computer processors to generate a heat map loss value and a mesh loss value.

18. The system of claim 17, further comprising training code configured to cause at least one of the one or more computer processors to train a hand pose estimator by minimizing the heat map loss value and the mesh loss value.

19. A non-transitory computer readable medium storing a computer program which, when executed by one or more computer processors, causes the one or more computer processors to:

receive hand image data corresponding to a hand image of a hand in two consecutive frames of video;

calculate optical flows corresponding to a change in a hand gesture of the hand in the two consecutive frames in a forward direction and a backward direction;

generate heat maps based on the optical flows;

estimate a hand mesh map based on the heat maps; and determine a three-dimensional (3D) hand pose present within the hand images based on the hand mesh map.

\* \* \* \* \*